US009938067B2

(12) United States Patent
Resurreccion, Jr. et al.

(10) Patent No.: US 9,938,067 B2
(45) Date of Patent: Apr. 10, 2018

(54) MICROWAVE PACKAGING (71) Applicant: GRAPHIC PACKAGING INTERNATIONAL, INC., Atlanta, GA (US)

(72) Inventors: Fermin P. Resurreccion, Jr., Thornton, CO (US); Dana Lauren Pearson, Lyons, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 231 days.

(21) Appl. No.: 14/814,638

(22) Filed: Jul. 31, 2015

(65) Prior Publication Data
US 2016/0031629 A1 Feb. 4, 2016

Related U.S. Application Data (60) Provisional application No. 61/999,647, filed on Aug. 1, 2014.

(51) Int. Cl.
*H05B 6/80* (2006.01)
*H05B 6/64* (2006.01)
(Continued)

(52) U.S. Cl.
CPC ............ *B65D 81/3453* (2013.01); *A23L 5/34* (2016.08); *H05B 6/6408* (2013.01);
(Continued)

(58) Field of Classification Search
CPC ....... H05B 6/6494; H05B 6/6408; A23L 5/34; B65D 81/3453; B65D 2581/3432;
(Continued)

(56) References Cited

U.S. PATENT DOCUMENTS 2,714,070 A 7/1955 Welch
3,271,169 A 9/1966 Baker et al.
(Continued)

FOREIGN PATENT DOCUMENTS

EP 0 242 701 A1 10/1987
EP 0 327 659 B1 6/1993
(Continued)

OTHER PUBLICATIONS

International Search Report and Written Opinion for PCT/US2015/043055 dated Oct. 23, 2015.
(Continued)

*Primary Examiner* — Quang Van
(74) *Attorney, Agent, or Firm* — Womble Bond Dickinson (US) LLP (57) ABSTRACT

A container for heating a food product with microwave energy having a wavelength. The container can include a generally circular centerline having an axis, and a receptacle including a sidewall extending at least partially around a cavity. At least a portion of the cavity can extend along at least a portion of the centerline. The sidewall can include an inner edge and an outer edge each being spaced apart from the axis of the centerline for at least partially retaining the food product in the cavity in proximity to the centerline.

33 Claims, 9 Drawing Sheets (51) Int. Cl.
 *B65D 81/34* (2006.01)
 *A23L 5/30* (2016.01)

(52) U.S. Cl.
 CPC ........ *H05B 6/6494* (2013.01); *A23V 2002/00* (2013.01); *B65D 2581/3432* (2013.01); *B65D 2581/3441* (2013.01); *B65D 2581/3472* (2013.01); *B65D 2581/3474* (2013.01); *B65D 2581/3475* (2013.01); *B65D 2581/3477* (2013.01); *B65D 2581/3479* (2013.01); *B65D 2581/3489* (2013.01); *B65D 2581/3494* (2013.01)

(58) Field of Classification Search
 CPC .... B65D 2581/3494; B65D 2581/3472; B65D 2581/3474; B65D 2581/3475; B65D 2581/3477; B65D 2581/3479; B65D 2581/3489; A23V 2002/00
 USPC .......... 219/730, 725, 732, 734, 735; 99/417, 99/451, DIG. 14, 410; 426/241, 243, 234
 See application file for complete search history.

(56) References Cited

U.S. PATENT DOCUMENTS

| | | |
|---|---|---|
| 3,708,086 A | 1/1973 | Colato |
| 3,835,281 A | 9/1974 | Mannix |
| 4,013,798 A | 3/1977 | Goltsos |
| 4,081,646 A | 3/1978 | Goltsos |
| 4,283,427 A | 8/1981 | Winters et al. |
| 4,413,167 A | 11/1983 | Martel et al. |
| 4,486,640 A | 12/1984 | Bowen et al. |
| 4,560,850 A | 12/1985 | Levendusky et al. |
| 4,660,716 A | 4/1987 | McMahon et al. |
| 4,847,459 A | 7/1989 | Desai |
| 4,848,579 A | 7/1989 | Barnes et al. |
| 4,866,234 A | 9/1989 | Keefer |
| 4,943,456 A | 7/1990 | Pollart et al. |
| 4,966,296 A | 10/1990 | Farrell |
| 5,002,826 A | 3/1991 | Pollart et al. |
| 5,026,958 A | 6/1991 | Palacios |
| 5,118,747 A | 6/1992 | Pollart et al. |
| 5,288,962 A | 2/1994 | Lorence et al. |
| 5,370,042 A * | 12/1994 | Tolchin ............ A47J 27/04 219/731 |
| 5,410,135 A | 4/1995 | Pollart et al. |
| 5,412,187 A | 5/1995 | Walters et al. |
| 5,424,517 A | 6/1995 | Habeger, Jr. et al. |
| 5,530,231 A | 6/1996 | Walters et al. |
| 5,593,610 A | 1/1997 | Minerich et al. |
| 5,698,127 A | 12/1997 | Lai et al. |
| 5,758,794 A | 6/1998 | Rider, Jr. et al. |
| 5,762,231 A | 6/1998 | Rider, Jr. et al. |
| 6,204,492 B1 | 3/2001 | Zeng et al. |
| 6,359,271 B1 | 3/2002 | Gidner et al. |
| 6,433,322 B2 | 8/2002 | Zeng et al. |
| 6,552,315 B2 | 4/2003 | Zeng et al. |
| 6,677,563 B2 | 1/2004 | Lai |
| 6,717,121 B2 | 4/2004 | Zeng et al. |
| 6,777,655 B2 | 8/2004 | Zhang et al. |
| 7,141,771 B2 | 11/2006 | Hopkins, Sr. |
| 7,378,625 B2 | 5/2008 | Richardson et al. |
| 8,096,452 B1 | 1/2012 | Rogers |
| 8,445,043 B2 | 5/2013 | Jackson et al. |
| 8,748,786 B2 | 6/2014 | Birchmeier et al. |
| 2004/0232143 A1 | 11/2004 | Zhu |
| 2008/0035634 A1 | 2/2008 | Zeng et al. |
| 2008/0202977 A1 | 8/2008 | Knudsen et al. |
| 2009/0208614 A1 | 8/2009 | Sharma et al. |
| 2013/0105471 A1 | 5/2013 | Hach |

FOREIGN PATENT DOCUMENTS

| | | |
|---|---|---|
| EP | 1 930 253 A1 | 6/2008 |
| JP | 11-332738 A | 12/1999 |
| JP | 2000-313485 A | 11/2000 |
| JP | 2007-045487 A | 2/2007 |
| WO | WO 2007/127371 | 11/2007 |

OTHER PUBLICATIONS

Supplementary European Search Report for EP 15 82 7093 dated Jan. 25, 2018.

* cited by examiner

MICROWAVE PACKAGING

CROSS-REFERENCE TO RELATED APPLICATIONS

This application claims the benefit of U.S. Provisional Patent Application No. 61/999,647, filed on Aug. 1, 2014.

INCORPORATION BY REFERENCE

The disclosure of U.S. Provisional Patent Application No. 61/999,647, which was filed on Aug. 1, 2014, is hereby incorporated by reference for all purposes as if presented herein in its entirety.

BACKGROUND OF THE DISCLOSURE

The present disclosure relates to blanks, containers, trays, constructs, and various features to facilitate forming a container from a blank.

SUMMARY OF THE DISCLOSURE

In one aspect, the disclosure is generally directed to a container for heating a food product with microwave energy having a wavelength. The container can comprise a generally circular centerline having an axis, and a receptacle comprising a sidewall extending at least partially around a cavity. At least a portion of the cavity can extend along at least a portion of the centerline. The sidewall can comprise an inner edge and an outer edge each being spaced apart from the axis of the centerline for at least partially retaining the food product in the cavity in proximity to the centerline.

In another aspect, the present disclosure is generally directed to a method of heating a food product. The method can comprise obtaining a container comprising a generally circular centerline having an axis, and a receptacle comprising a sidewall extending at least partially around a cavity. At least a portion of the cavity can extend along at least a portion of the centerline. The sidewall can comprise an inner edge and an outer edge each being spaced apart from the axis of the centerline for at least partially retaining the food product in the cavity in proximity to the centerline. The method further can comprise positioning at least a portion of the food product in the cavity, and exposing the container and the food product to microwave energy having a wavelength.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure relates generally to various aspects of containers, constructs, trays, materials, packages, elements, and articles, and methods of making such containers, constructs, trays, materials, packages, elements, and articles. Although several different aspects, implementations, and embodiments are disclosed, numerous interrelationships between, combinations thereof, and modifications of the various aspects, implementations, and embodiments are contemplated hereby. In one illustrated embodiment, the present disclosure relates to a container or tray for holding, heating, and/or cooking food items or various other articles. However, in other embodiments, the container or tray can be used to form other non-food containing articles or may be used for refrigerating or other uses.

Figure 1:
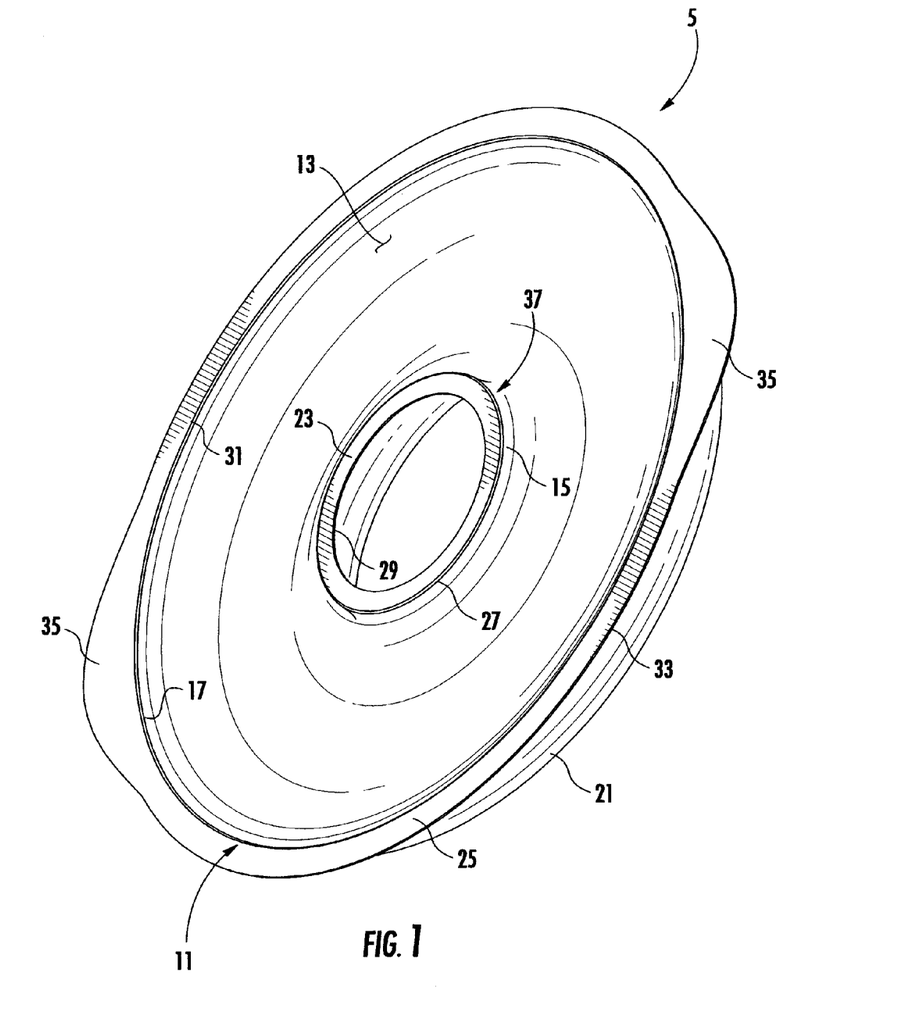
FIG. 1 is a top perspective view of a container according to a first embodiment of the disclosure.
Figure 2:
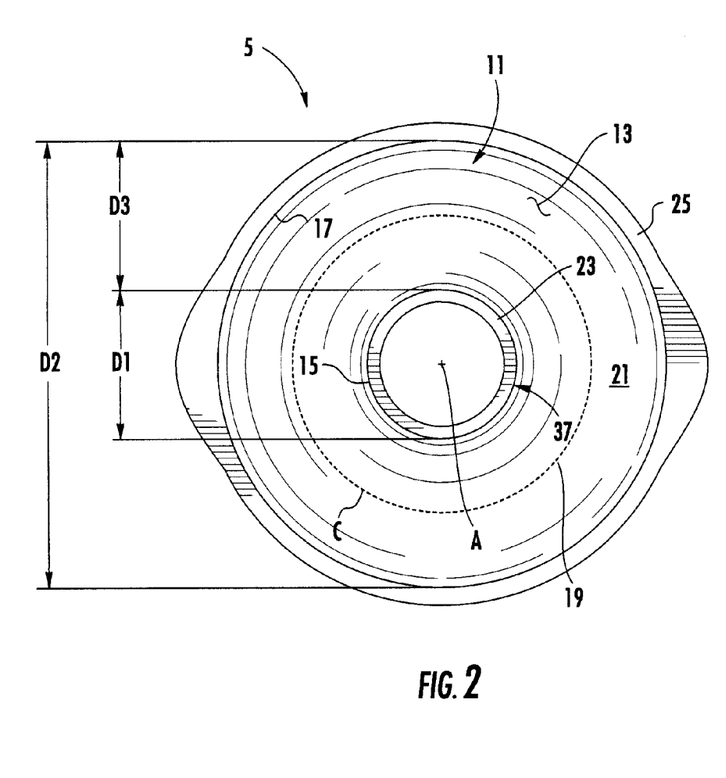
FIG. 2 is a top plan view of the container of FIG. 1.
Figure 3:
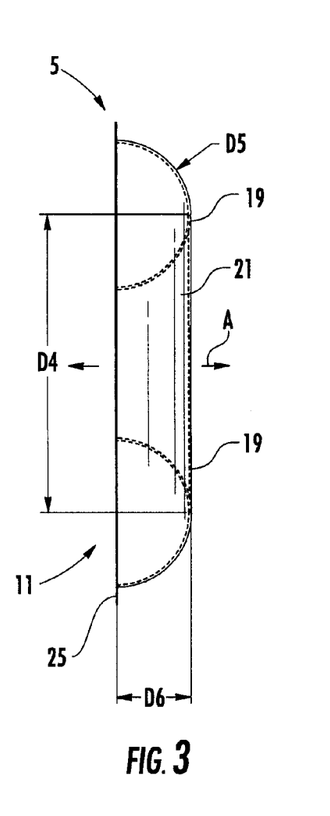
FIG. 3 is an elevation view of the container of FIG. 1.

FIGS. 1-3 illustrate a container 5 with a generally toroid-shaped receptacle 11 according to a first embodiment of the disclosure. In the illustrated embodiment, the container 5 is a tray or a bowl that is curved (e.g., circular) along an outer perimeter and along an inner perimeter. The container 5 can be press formed and/or erected from a blank (not shown). It is understood that the blank can be press-formed into the container 5 by a forming tool (not shown), through a one-step or multi-step forming process by which the blank is cut from a supply stock and press-formed into the container 5 by any suitable forming tool assembly. Alternatively, the container 5 could be erected from one or more blanks (not shown) such as by folding and/or gluing different aspects of the blank(s) to form the container. Also, the container 5 could be alternatively and/or could be alternatively formed without departing from the scope of this disclosure.

The container 5 can be formed from a single layer, such as, but not limited to, paperboard, cardboard, paper, or a polymeric sheet. Alternatively, the carton 5 can be formed from more than one layer (e.g., a laminate). In accordance with the exemplary embodiments of the present disclosure, a laminate can include a lamination layer mounted on a substrate or base layer (e.g., a polymer lamination layer on a paperboard substrate). In one embodiment, the lamination layer could be disposed on an interior side of the substrate. Alternatively, the container 5 could be formed of any suitable material or suitable combination of materials. For example, the container 5 could include a molded polymer.

FIGS. 1-3 show one embodiment of the disclosure comprising a container 5 with a receptacle 11 that generally has a partial torus shape with an interior space or cavity 13, an inner edge or perimeter 15, and an outer edge or perimeter 17. For example, as shown in FIGS. 2 and 3, the receptacle 11 can be generally half a torus so that the cross-section of the torus generally forms a semicircle (e.g., as shown partially in phantom in FIG. 3). A centerline C of the container 5 and/or the receptacle 11 can extend along the base or nadir 19 (e.g., the lowermost point of the cross-sectional semicircle) of the receptacle 11 as shown in FIG. 2. In a preferred embodiment, the inner perimeter 15, the outer perimeter 17, and/or the centerline C could be, for example, circular, generally circular, substantially circular, and/or nearly circular. In an alternative embodiment, the receptacle could have a different shape. For example, either or both of the inner perimeter 15 and the outer perimeter 17 of the receptacle 11 could be an oval, a rectangle, other polygons, and/or any other suitable shape. However, in one embodiment, the container with non-circular shapes for the inner perimeter 15, the outer perimeter 17, and/or the centerline C may be less effective at evenly heating food products (e.g., those having a relatively lossless dielectric material, described in more detail below) than a container 5 with relatively circular features. In another example, the cross-sectional shape of the receptacle 11 could have a different arcuate shape (e.g., a ratio of width and depth that is less than one, generally equal to one, or greater than one), could be generally rectangular (e.g., with sidewalls extending from a bottom wall), or could have any other suitable shape. Additionally, the centerline C of the receptacle 11 could be offset from the nadir 19 and/or the nadir 19 could be widened (e.g., so that the receptacle 11 has a flatter bottom).

The container 5 comprises a sidewall 21 (e.g., a bottom wall portion adjacent the nadir 19 and sidewall portions extending upwardly from the bottom wall portion), an inner flange 23 extending at least inwardly from the inner perimeter 15 of the receptacle 11, and an outer flange 25 extending at least outwardly from the outer perimeter 17 of the receptacle 11. Accordingly, the inner perimeter 15 can be disposed adjacent an outer edge 27 of the inner flange 23 with an inner edge 29 of the inner flange 23 inwardly spaced from the outer edge 27 and the inner perimeter 15. Similarly, the outer perimeter 17 can be disposed adjacent an inner edge 31 of the outer flange 25 with an outer edge 33 of the outer flange 25 outwardly spaced from the inner edge 31 and the outer perimeter 17. Alternatively, the inner flange 23 and/or the outer flange 25 could extend toward the interior space 13 of the receptacle 11 from the respective perimeters 15, 17. For example, the inner flange 23 could be disposed on the inner perimeter 15 so that the edges 27, 29 are spaced from the inner perimeter 15, and/or the outer flange 25 could be disposed on the outer perimeter 17 so that the edges 31, 33 are spaced from the outer perimeter 17. In one embodiment, the outer flange 25 can include handles or tabs 35 where the outer flange is wider than a remainder of the outer flange. Accordingly, the container 5 can be gripped at the tabs 35 for lifting and moving the container especially when the contents of the container are hot.

As shown in FIGS. 1-3, the inner perimeter 15, the inner flange 23, the outer perimeter 17, and the outer flange 25 extend around a central axis A of the centerline C. In one embodiment, the inner perimeter 15, the inner flange 23, the outer perimeter 17, and the outer flange 25 can be generally concentric with the centerline C. The sidewall 21, the inner flange 23, and/or the outer flange 25 could be otherwise shaped, arranged, positioned, and/or configured without departing from the disclosure. For example, one or both of the flanges 23, 25 could be integrally formed with the sidewall 21 (e.g., a folded portion of the wall, a rolled rim, and/or another suitable feature) or either of the flanges could be attached to the sidewall 21 and/or an integral flange portion (e.g., an encapsulated rim, or other suitable feature).

Figure 4:
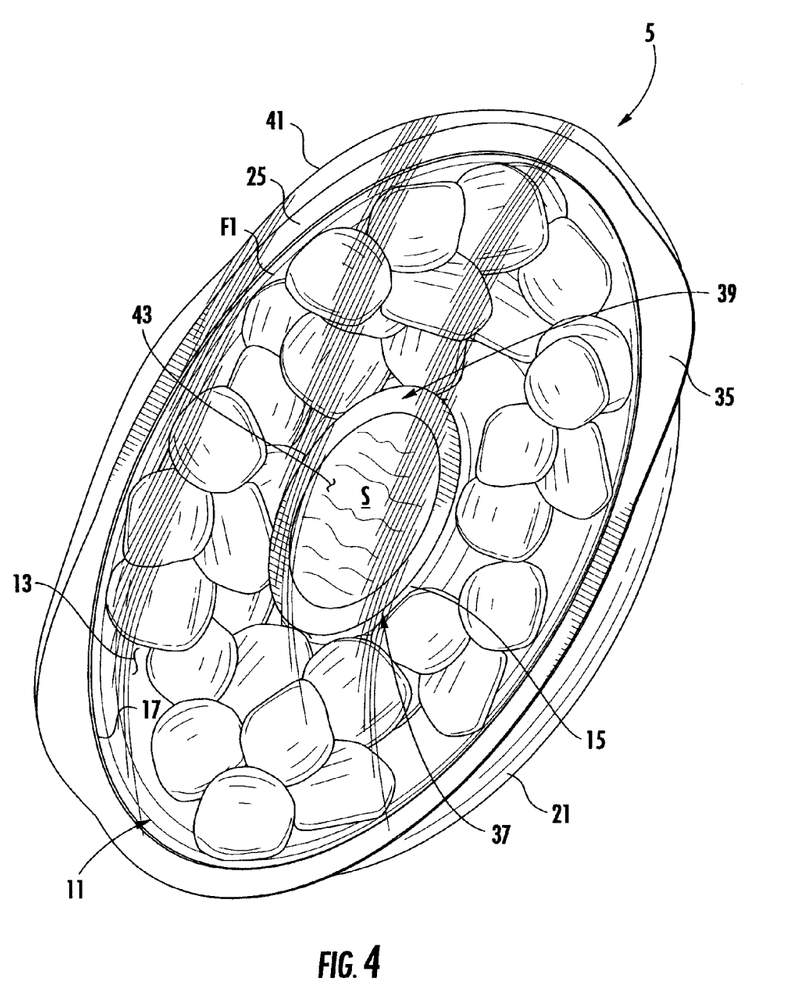
FIG. 4 is a top perspective view of the container of FIG. 1 with a primary food item and a secondary food item according to the first embodiment of the disclosure.

In the illustrated embodiment, the container 5 can include an interior opening adjacent the inner flange 23 and the inner perimeter 15. The interior opening and the inner flange 23 generally can form a central receiver 37 (FIGS. 1 and 2) for a secondary container 39 (e.g., as shown in FIG. 4 by way of example). In one embodiment, the central receiver 37 can cooperate with the inner perimeter 15 and/or an inner portion of the sidewall 21 to function as an inner spacing feature to help retain a food product in the receptacle 11. The (primary) container 5 can support the secondary container 39, such as, but not limited to, a bin, tub, or other suitable container for holding a dipping sauce, and/or another suitable secondary food item S (FIG. 4) or other item that can accompany and/or be heated with a primary food item F1 or F2 (e.g., a food item in the receptacle 11 as shown by example in FIGS. 4 and 5). For example, as shown in FIG. 4, the secondary container 39 can be at least partially received in the central receiver 37 and at least partially supported by the inner flange 23 (e.g., a flange and/or another protrusion of the secondary container can rest on the inner flange 23).

In one embodiment, the secondary container 39 can be engaged with the central receiver 37 before, during, and/or after heating. For example, the secondary container 39 can be inserted prior to heating so that the primary and secondary food items are heated together, and then the container 5 and the secondary container can act as a serving tray for the food items F1, S after heating. Alternatively, the secondary container 39 could be inserted after heating of the primary food item F1 in the receptacle 11, and the container 5 can support the secondary container 39 and act as a serving tray for the primary and secondary food items F1, S. The central receiver 37 and/or the secondary container 39 could be otherwise shaped, arranged, positioned, and/or configured without departing from the disclosure. For example, the secondary container 39 could be integrally formed with the inner flange 23 and/or another portion of the container 5. Additionally, at least the inner edge 29 of the inner flange 23 could be a different shape than the general shape of the container 5 for accommodating a secondary container 39 with a different shape. For example, the secondary container 39 could have a generally oval or rectangular shape, and the flange 23 can be shaped accordingly for receiving the secondary container 39. Alternatively, the inner flange 23 could have a different shape than the secondary container 39.

In one embodiment, as shown in FIG. 2 the inner perimeter 15 can have a diameter of D1, the outer perimeter 17 can have a diameter of D2, and the outer perimeter 17 generally can be spaced apart from the inner perimeter 15 by a distance D3. As shown in FIG. 3, the centerline C at the nadir 19 can have a diameter of D4, and the semicircular cross-section of the receptacle 11 can have a diameter D5. As shown in FIG. 3, the receptacle 11 can have a depth of distance D6. In the illustrated embodiment, the depth of the receptacle is generally the radius of the semicircular cross-section of the receptacle, and the distance D6 is generally half the diameter D5. Also in the illustrated embodiment, the distance D3 between the perimeters 15, 17 can be generally equal to the diameter D1 of the inner perimeter 15, and the diameter D4 of the centerline C at the nadir 19 can be generally twice the diameter D1 of the inner perimeter 15. Additionally, the diameter D2 of the outer perimeter 17 can be generally three times the diameter D1 of the inner perimeter 15. In one embodiment, the distance D3 can be the maximum width of the cavity 13 extending radially from the inner perimeter 15 to the outer perimeter 17 since the cross-section of the receptacle 11 is generally semicircular (FIG. 3). The dimensions of the container 5 could be otherwise configured without departing from the disclosure.

In the illustrated embodiment, the container 5 can be geometrically dimensioned for improved simultaneous heating of two or more different food items with different relative responses to microwave energy without requiring a microwave energy interactive material (e.g., a susceptor, shield, or other active material) incorporated into or used with the container 5. For example, a first or primary food item F1 or F2 (e.g., one or more pellets, chips, Nibbits, and/or other suitable solid and/or liquid food items) can be disposed in the interior space 13 of the receptacle 11, and a secondary food item S (e.g., one or more dipping sauces, toppings, ingredients to be mixed in with the primary food item, and/or any other suitable solid and/or liquid food items) can be disposed in a secondary container 39 received in the central receiver 37 so that the secondary food item 39 is generally centered in the container 5.

In one embodiment, the primary food item generally can comprise a dielectric material that is relatively lossless as compared to the secondary food item (e.g., the secondary food item can comprise a relatively lossy dielectric material). For example, the secondary food item can include relatively more water, salt, and/or fat than the primary food item. In one embodiment, a relatively lossless dielectric material generally will not disperse energy as heat as readily and/or as easily as a relatively lossy dielectric material. Accordingly, a food item comprising a relatively lossy dielectric material generally will heat up faster/more easily when exposed to microwave energy (e.g., in a microwave oven) than a food comprising relatively lossless dielectric material when heated under similar conditions (e.g., in electromagnetic fields having similar amplitudes). As a result, the secondary food item S in the secondary container 39 received in the central receiver 37 generally will heat more readily/easily when exposed to microwave energy than the primary food item F1 in the receptacle 11. However, as described in more detail below, the geometry of the container 5 can be configured to cooperate with the distribution of the electromagnetic field produced in the microwave oven so that the primary food item F1 is exposed to higher amplitude of the electromagnetic field than the secondary food item S.

In the illustrated embodiment, the dielectric property of a material (e.g., food) includes its electric permittivity and/or its magnetic permeability. Food products often can be non-magnetic dielectric materials so that the conversion of the electric field component of microwave energy into heat can be dependent on the complex permittivity of the material. The complex permittivity includes a dielectric constant (e.g., the electric charge or energy storage capability of a material relative to free space) and a dielectric loss factor (e.g., the ability of a material to absorb energy from an electric field and subsequently dissipate the energy into heat relative to free space). The heat dissipation can be due to dipole relaxation (i.e., for polar molecules, such as water molecules) and/or ionic absorption (i.e., for dissolved ions, such as salt in a food material). Accordingly, in one exemplary embodiment, a first food product with little or no polar molecules and/or dissolved ions may have worse heat dissipation (e.g., may be a relatively lossless dielectric material) compared with a second food product with more polar molecules and/or dissolved ions. Accordingly, the second food product may have relatively better heat dissipation (e.g., may be a relatively lossy dielectric material).

In the illustrated embodiment, the geometric dimensions of the container 5 can be configured so that the primary food item, comprising a relatively lossless dielectric material, can be heated along with a secondary food item comprising a relatively lossy dielectric material. For example, the diameter D4 of the centerline C at the nadir 19 can be generally equal to the wavelength (e.g., the average wavelength) of the microwaves (e.g., the electromagnetic field) in the microwave oven, and the curved sidewall 21 of the receptacle 11 can help generally retain the primary food F1 item in an area proximate to the centerline C and the nadir 19. In one embodiment, the diameter D1 and the distance D3 generally can be equal to half the wavelength of the microwaves, and, accordingly, the secondary food item can be confined to the central portion of the container 5 in a diameter that is less than half the wavelength of the microwaves and that is less than a quarter of the wavelength from the central axis A of the centerline C.

In one embodiment, this configuration of the dimensions of the container 5 can help retain the primary food item (e.g., the relatively lossless dielectric material) in an area that generally will be exposed to more microwave energy (e.g., in a circle with a diameter of one wavelength) than the central portion of the container 5 where the secondary food item can be contained (e.g., within a quarter of a wavelength from the central axis A of the centerline C) since the microwave energy or the electric field due to the microwaves tends to be more intense (e.g., have a higher amplitude) in the area that is generally half the microwave wavelength from the central axis A of the centerline C. Since the cross-section of the receptacle 11 is generally semicircular, the diameter D5 is generally equal to the distance D3 (at half the wavelength) and the depth D6 is generally equal to half the diameter D5 (at a quarter of the wavelength). Accordingly, these dimensions D5, D6 can further help retain the primary food item in the area of higher microwave energy during heating. Further, due to the generally circular configuration of the receptacle 11 (with the generally half-torus shape), the microwaves generally are evenly distributed and geometrically reflected in the location of the lossless dielectric material (the primary food F1 item in the receptacle 11). Any of the dimensions of the container 5 could be alternatively configured with respect to the wavelength of the microwaves and/or the food items could be alternatively positioned without departing from the scope of the disclosure.

In the illustrated embodiment, during heating, the primary food item F1 in the receptacle 11 generally will be exposed to an electric field with a higher amplitude than the electric field at the central portion of the container. Since the relatively lossless dielectric material of the primary food item F1 experiences a higher amplitude electric field than the secondary food item S in the central portion of the container 5, the primary food item F1 can heat up at a rate that is similar to or identical to the rate of heating of the secondary food item S with the relatively lossy dielectric material. Stated another way, the relatively lossy dielectric material would typically heat up much faster than the relatively lossless dielectric material; however, the positioning of the primary and secondary food items F1, S results in the relatively lossy dielectric material receiving a lower amplitude electric field than the relatively lossless dielectric material, and the food items can heat up at generally similar rates.

Accordingly, the container 5 can help generally slow the heating of the relatively lossy dielectric material of the secondary food item S and/or generally speed up the heating of the relatively lossless dielectric material of the primary food item F1 without the use of coatings, laminated layers, or other features with microwave energy interactive materials that can at least partially shield the secondary food item S and/or generate heat near the primary food item F1, for example. In other words, the container 5 uses natural wave transmission and reflection at the interface of two different dielectric media (e.g., at an interface between air and the surface of the food item) rather than active elements. Such active elements (e.g., microwave energy interactive materials) can add cost and/or weight to the container, for example. In an alternative embodiment, an active element can be used in conjunction with the geometric configuration of the container 5.

The active or microwave energy interactive elements can include materials such as is common in MicroRite® containers available from Graphic Packaging International of Marietta, Ga. A microwave interaction layer can be commonly referred to as, or can have as one of its components, a foil, a microwave shield, or any other term or component that refers to a layer of material suitable for shielding microwave energy and/or causing heating in a microwave oven. Alternatively, the microwave interaction layer can be any suitable material that is laminated onto a substrate, which can be in the form of paperboard, cardboard, polymer, or any other suitable material. The microwave interaction layer can be other suitable microwave interactive materials set forth below, or any other suitable material.

In one exemplary embodiment, the container 5 can be dimensioned for use in a microwave oven that generates microwaves at a wavelength (e.g., an average wavelength) of approximately 12.2 centimeters (cm), which correlates to a microwave frequency of approximately 2.45 gigahertz (GHz). Accordingly, the diameter D4 of the centerline C is approximately 122 millimeters (mm). The diameter D1 of the inner perimeter 15, the distance D3 between the perimeters 15, 17, and the diameter D5 of the cross-section of the receptacle 11 can be approximately 61 mm or half a wavelength. Additionally, the depth D6 of the container 5 can be approximately 30 mm or a quarter of a wavelength. Alternatively, the dimensions could be configured for microwaves or other suitable electromagnetic radiation having any suitable wavelength or frequency, such as wavelengths that are smaller than 12.2 cm or larger than 12.2 cm. For example, an alternative microwave oven could generate microwaves at a wavelength of approximately 32.8 cm, which correlates to a microwave frequency of approximately 915 megahertz (MHz), and the diameters D4, D1 could be approximately 328 mm and 164 mm, respectively. Other microwave, radio wave, or other electromagnetic wave frequencies that could be used include frequencies of approximately 433.92 MHz, approximately 896 MHz, 2375 MHz, and/or any suitable frequency in the range of approximately 13 MHz to approximately 24 GHz, for example.

Any of the dimensions noted above could be larger or smaller than noted or could be inside or outside the listed ranges without departing form the scope of the disclosure. All of the dimensional information presented herein is intended to be illustrative of certain aspects of the disclosure and is not intended to limit the scope of the disclosure, as various other embodiments of the disclosure could include dimensions that are greater than or less than the dimensions included herein.

As shown in FIG. 4, the secondary container 39 is received in the inner receptacle 37 of the container 5 so that the flange of the secondary container 39 rests on the inner flange 23 of the container 5. The secondary container 39 alternatively could be integral with or attached to the container 5. In the illustrated embodiment, the secondary container 39 can be generally coaxial/concentric with the receptacle 11. As shown in FIG. 4, the receptacle 11 and/or the secondary container 39 can be at least partially covered by a cover 41 (e.g., a sheet of plastic or other suitable material and/or any other suitable cover or lid). The primary food item F1 is disposed in the interior space 13 of the receptacle 11. Additionally, the secondary food item S is disposed in an interior space or cavity 43 of the secondary container 39. In one embodiment, the secondary container 39 could have a separate and/or additional lid or cover that is, for example, under and/or spaced from the cover 41. In an exemplary embodiment, the secondary food item S can comprise a relatively lossy dielectric material as compared to the primary food item F1, which is a relatively lossless dielectric material. The container 5 including the receptacle 11, the secondary container 39, the cover 41, and/or the food item F1 could be otherwise shaped, arranged, positioned, and/or configured without departing from the disclosure.

As shown in FIG. 4, the primary food item F1 can be a chip, such as Sakata Mini (e.g., rice chips), disposed in the receptacle 11. The primary food item F1 generally can be disposed in a ring with a diameter that is generally equal to the wavelength of the microwaves emitted by a microwave oven (e.g., in proximity to the centerline C and the nadir 19 of the receptacle 11). Additionally, the secondary food item S (e.g., a dipping sauce) can be contained in the secondary container 39, which is received in the central receiver 37. The entire package can be enclosed by a cover 41.

Figure 5:
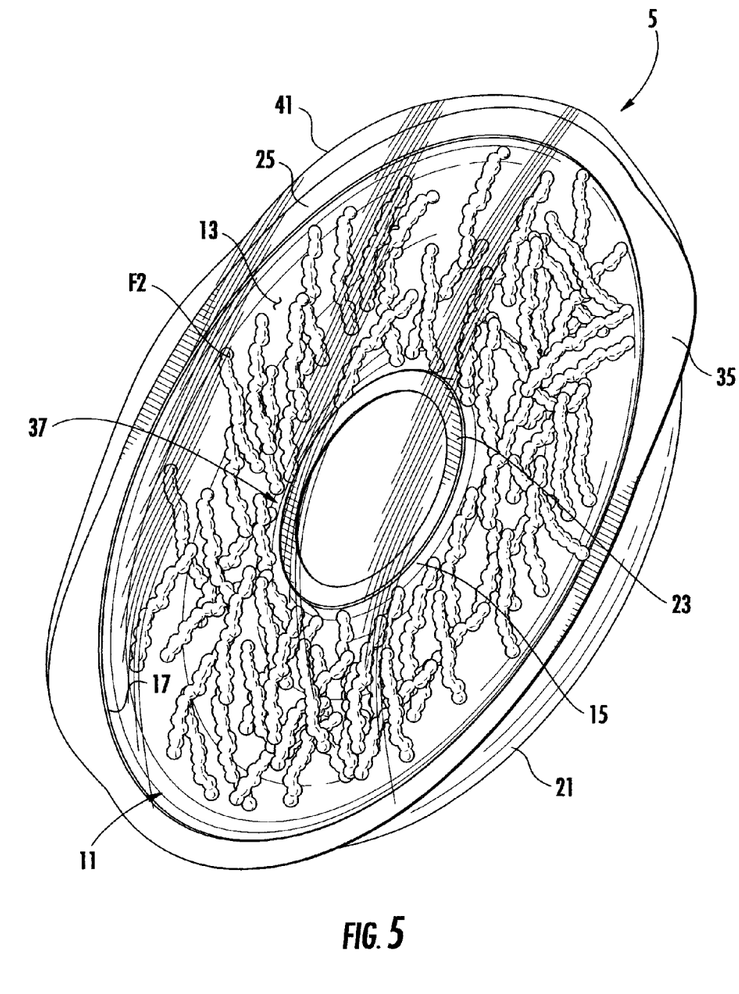
FIG. 5 is a top perspective view of the container of FIG. 1 with a different primary food item according to the first embodiment of the disclosure.

Alternatively, as shown in FIG. 5, a different primary food item F2, such as Nibbits (e.g., a puffed pellet), can be retained in the receptacle 11. As shown in FIG. 5, the secondary food item S could be omitted. Alternatively, any suitable secondary food item and secondary container could be received in the central receiver 37.

In one example, the primary food item F1 (e.g., Sakata Mini rice chips) is disposed generally along a centerline with a diameter that is approximately equal to the wavelength of the microwave energy produced by a particular microwave oven and is heated in that microwave oven. The secondary food item was omitted in this example. After heating the primary food item F1 in the microwave oven (e.g., for approximately 30 seconds), the primary food item F1 becomes puffed (e.g., expands) with even cooking and no observable burning.

In another example, the primary food item F2 (e.g., Nibbits) is disposed generally along a centerline with a diameter that is approximately equal to the wavelength of the microwave energy produced by a particular microwave oven and is heated in that microwave oven. After heating the primary food item F2 for approximately 30 seconds, the primary food item F2 generally becomes puffed and heated with a minimal amount of burning observed.

Figure 6:
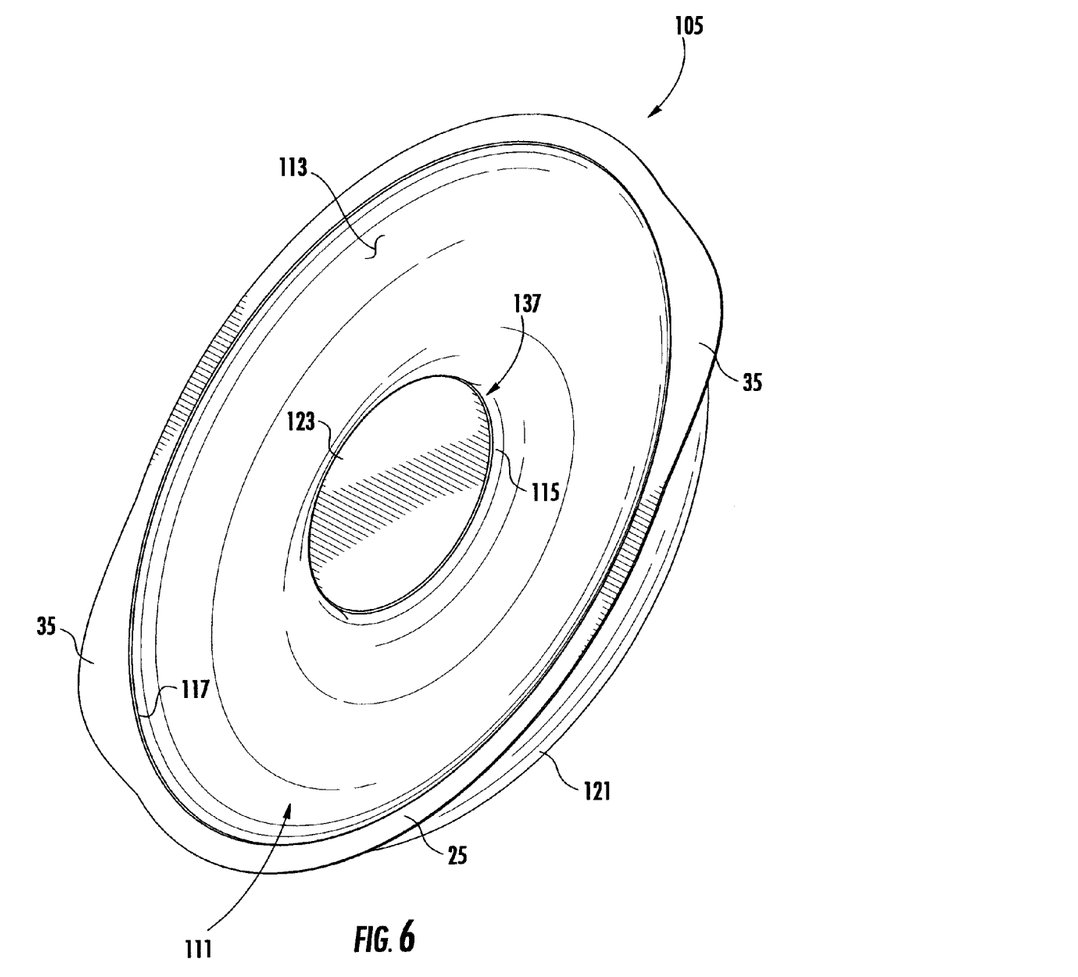
FIG. 6 is a top perspective view of a container according to a second embodiment of the disclosure.
Figure 7:
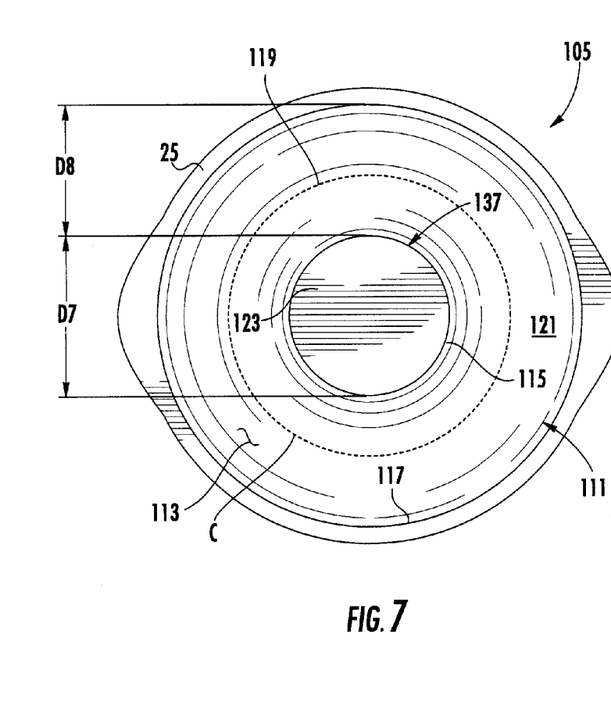
FIG. 7 is a top plan view of the container of FIG. 6.
Figure 8:
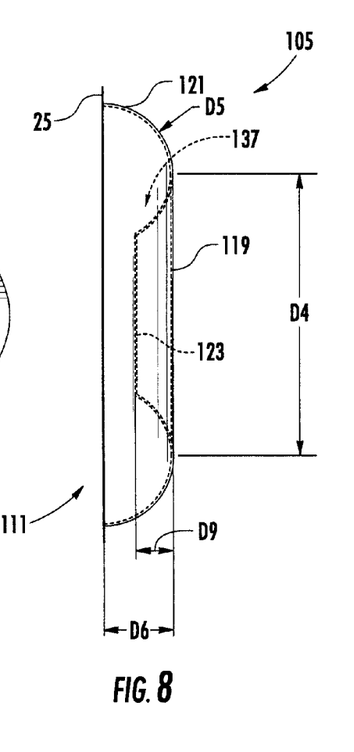
FIG. 8 is an elevation view of the container of FIG. 6.

FIGS. 6-8 are views of a container 105 according to a second embodiment of the disclosure. The second embodiment is generally similar to the first embodiment, except for variations noted and variations that will be apparent to one of ordinary skill in the art. Accordingly, similar or identical features of the embodiments have been given like or similar reference numbers. As shown in FIG. 6, the container 105 includes a receptacle 111 and an inner spacing feature 137. In the illustrated embodiment, the inner spacing feature 137 includes a top panel 123 extending across the inner spacing feature 137 instead of the flange 23 and inner receptacle 37 of the first embodiment. As shown in FIG. 6, the top panel 123 can extend inwardly from the inner perimeter 115 of the receptacle 111. The inner spacing feature 137 can include the inner perimeter 115 and an inner portion of the sidewall 121 to help retain the food product in the receptacle 111, outwardly of the interior of the container 105. The receptacle 111 and/or the inner spacing feature 137 could be otherwise shaped, arranged, positioned, and/or configured without departing from the disclosure.

As shown in FIGS. 7 and 8, in one embodiment, similarly to the first embodiment, the diameter D4 of the centerline C at the nadir 119 of the container 105 is generally equal to the wavelength (e.g., the average wavelength) of the microwave energy produced in the microwave oven in which the container 105 is to be used. Additionally, similarly to the first embodiment, the diameter D5 of the outer wall of the receptacle 111 is generally equal to half of the wavelength (e.g., half the average wavelength) of the microwaves in the microwave oven, and the depth D6 of the receptacle 111 is generally equal to a quarter of the wavelength (e.g., a quarter the average wavelength) of the microwave energy. In contrast to the first embodiment, the diameter D7 of the top panel 123 of the inner spacing feature 137 generally is larger than the distance D8. For example, in one embodiment wherein the average wavelength of the microwaves is approximately 122 mm, the diameter D7 could be approximately 69.46 mm and the distance D8 could be approximately 56.48 mm. In an alternative embodiment, the diameter D7 and the distance D8 could be generally equal, or the distance D8 could be larger than the diameter D7.

As shown in FIG. 8, the height D9 of the inner spacing feature 137 is approximately or generally greater than half the depth D6 of the receptacle 111. For example, in one embodiment wherein the average wavelength of the microwaves is approximately 122 mm, the depth D6 of the receptacle 111 is approximately 30 mm and the height D9 of the inner spacing feature 137 is approximately 15.5 mm. In an alternative embodiment, the height D9 could be any suitable height (e.g., less than half the depth D6, generally equal to the depth D6, greater than the depth D6, etc.).

In use, the container 105 can help a food item comprising a generally lossless dielectric material to cook evenly when exposed to microwave energy (e.g., in a microwave oven). For example, the curved wall 121 of the receptacle 111 can cooperate with the inner spacing feature 137 to help retain the food item placed in the cavity 113 in proximity to the centerline C of the receptacle 111. The food item generally is retained in a generally circular area having a diameter that is approximately equal to the average wavelength of the microwave energy (e.g., the diameter D4 of the centerline C is configured to be approximately equal to the average wavelength). Accordingly, the food item in the receptacle 111 (e.g., in an area that is less than a quarter of a wavelength of the microwave energy from the centerline C) will be exposed to a generally consistent heating energy (e.g., a generally consistent electromagnetic field intensity) throughout the receptacle 111 whereas food items spaced farther inwardly or outwardly from the centerline C may be exposed to a different intensity (e.g., lower) of microwave energy. Retaining the food item in proximity to the centerline C promotes even heating of the food item since generally lossless dielectric material generally will not disperse energy as heat as readily and/or as easily (e.g., to areas exposed to less microwave energy) as a relatively lossy dielectric material. Retaining the food item having relatively lossless dielectric material in proximity to the centerline C can help reduce overheating and/or under-heating of portions of the food item since most or all of the food item is exposed to substantially the same or nearly the same microwave energy.

Figure 9:
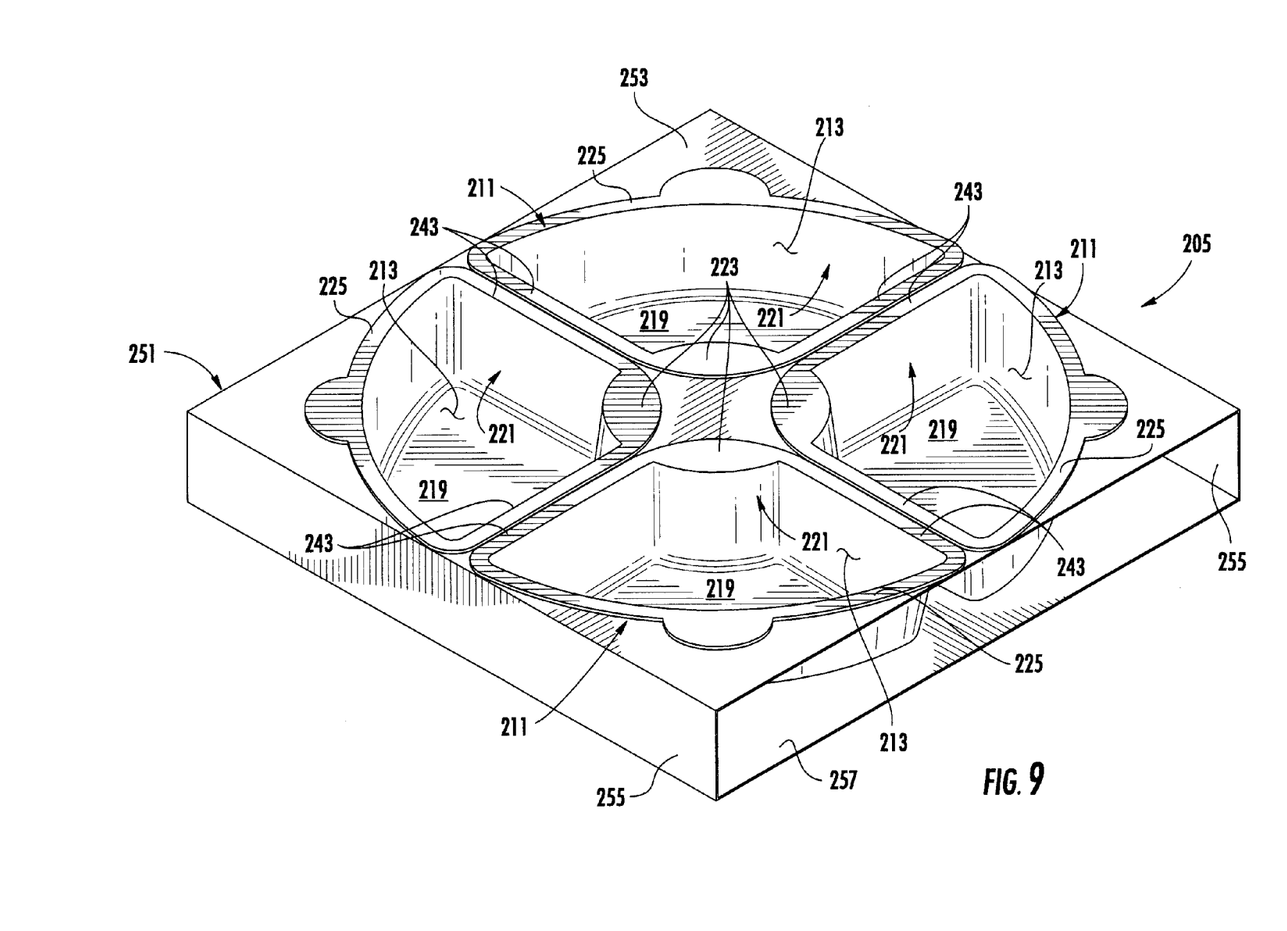
FIG. 9 is a top perspective view of a container according to a third embodiment of the disclosure.
Figure 10:
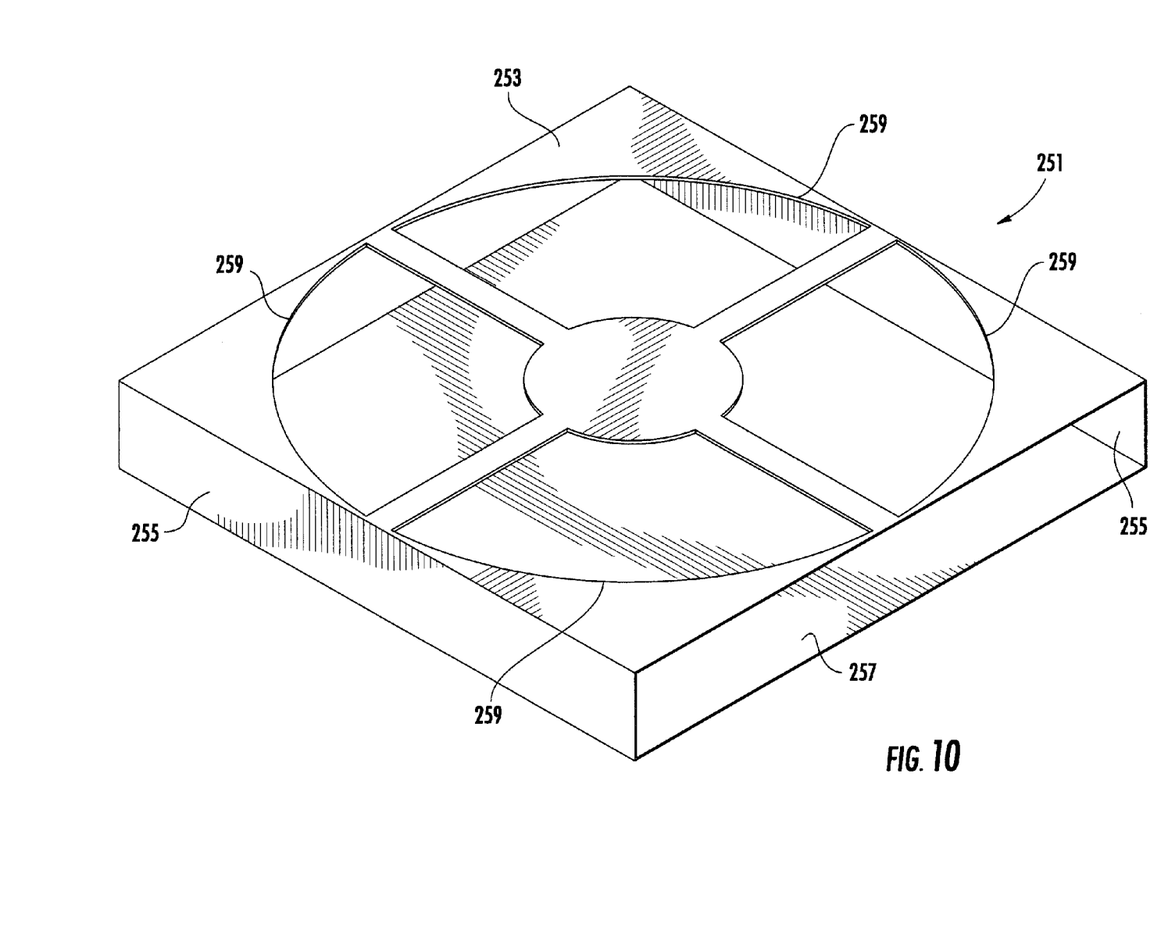
FIG. 10 is a top perspective view of a support element of the container of FIG. 9.
Figure 11:
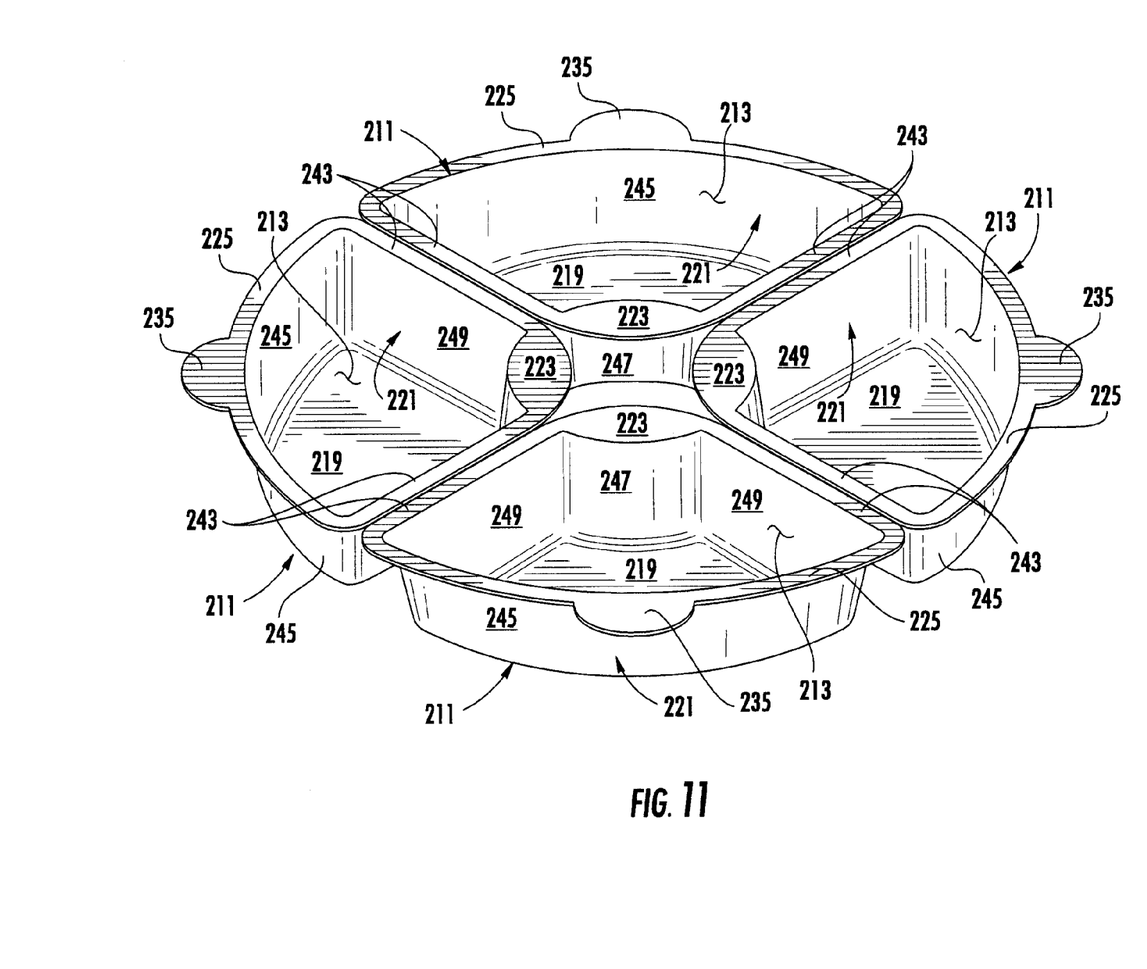
FIG. 11 is a top perspective view of a plurality of receptacles of the container of FIG. 9.

FIGS. 9-11 are views of a container 205 according to a third embodiment of the disclosure. The third embodiment is generally similar to the first and second embodiments, except for variations noted and variations that will be apparent to one of ordinary skill in the art. Accordingly, similar or identical features of the embodiments have been given like or similar reference numbers. As shown in FIG. 9, the container 205 includes a support element 251 supporting four receptacles 211. In one embodiment, the support element 251 can be formed from one or more materials, such as, but not limited to, paperboard, cardboard, paper, polymeric sheet(s), molded polymer(s), and/or laminates and/or other combinations thereof. As shown in FIGS. 9 and 10, the support element 251 includes a top panel 253 supported by two side panels 255 and a base panel 257. The top panel 253 has an opening 259 for each of the receptacles 211. In the illustrated embodiment, the container 205 includes four receptacles 211 and four openings 259. Alternatively, the container 205 could include any suitable number of receptacles 211 and openings 259. As shown in FIG. 10, the openings 259 generally can correspond in shape to the respective sidewalls 221 of the respective receptacles. The receptacles 211 have respective cavities 213 and can be individually removed from the support element 251 to function as serving dishes for respective users.

As shown in FIGS. 9 and 11, the cavity 213 of each receptacle 211 is at least partially defined by a bottom wall 219 and a sidewall 221 extending upwardly from the bottom wall 219. In the illustrated embodiment, the bottom wall 219 can form a base for setting the receptacle 211 on a table, for example, when functioning as a serving dish. Alternatively, the sidewall 221 and the bottom wall 219 can be curved to form a rounded bottom similarly to the sidewalls 21, 121 of the first and second embodiments. As shown in FIG. 11, the sidewall 221 includes an inner curved portion 245, an outer curved portion 247, and two oblique portions 249 extending between the inner curved portion 245 and the outer curved portion 247. In the illustrated embodiment, the inner curved portion 245 is convex relative to the cavity 213 and the outer curved portion 247 is concave relative to the cavity 213. The inner curved portion 245 and the outer curved portion 247 of the sidewall 221 of the receptacles 211 can cooperate to help retain a food item in the cavities 213 in a generally circular area around a central axis of the container 205. For example, in one embodiment, the inner curved portions 245 of the sidewalls 221 of the receptacles 211 can cooperate to generally form an inner circle and the outer curved portions 247 of the sidewalls 221 can cooperate to generally form an outer circle, wherein the difference between the diameters of inner circle and the outer circle can be generally analogous to the centerline C of the second embodiment (FIG. 7). Accordingly, in one embodiment, the cavities 213 of the receptacles can be arranged to retain a food item (e.g., a food item comprising a relatively lossless dielectric material or any other suitable food item) in a generally circular area having an average diameter that is approximately equal to the average wavelength of the microwaves produced in a microwave oven similarly to the container 105 in the second embodiment. Alternatively, the centerline could be spaced any suitable distance from the inner circle and/or the outer circle.

As shown in FIG. 11, each of the receptacles 211 can have an inner flange 223 extending inwardly from a top edge of the inner curved portion 245 of the sidewall 221, an outer flange 225 extending outwardly from a top edge of the outer curved portion 247 of the sidewall 221, and two intermediate flanges 243 extending from the respective oblique portions 249 of the sidewall 221. The flanges 223, 225, 243 can cooperate to form a continuous peripheral flange for each receptacle 221, and the flanges can rest on the top panel 253 of the support element 251 adjacent the respective opening 259. Accordingly, the top panel 253 can help support the receptacles 211 at the flanges 223, 225, 243 and retain the receptacles 211 in the illustrated position (FIG. 9). The bottom walls 219 of the receptacles 211 can rest on the base panel 257 of the support element 251 in one embodiment. The outer flange 225 of each receptacle 211 can include an outer tab 235 and the inner flange 223 of the respective receptacles 211 can form an inner tab. Accordingly, each of the receptacles 211 can be lifted out of the support element 251 and/or held at the outer tab 235 and/or the inner flange 223.

The container 205, including the support element 251 and/or any or all of the receptacles 211, could be otherwise shaped, arranged, positioned, and/or configured without departing from the disclosure.

Any of the features of the various embodiments of the disclosure can be combined with, replaced by, or otherwise configured with other features of other embodiments of the disclosure without departing from the scope of this disclosure.

Optionally, one or more portions of the blank or other constructs described herein or contemplated hereby may be coated with varnish, clay, or other materials, either alone or in combination. The coating may then be printed over with product advertising or other information or images. The blanks or other constructs also may be selectively coated and/or printed so that less than the entire surface area of the blank or substantially the entire surface area of the blank may be coated and/or printed.

Further, the containers disclosed herein may cooperate with a lid (not shown) for heating and/or cooking a food product that is held in the container without departing from the disclosure.

In an alternative embodiment, any of the blanks, containers, or other constructs of this disclosure may optionally include one or more features that alter the effect of microwave energy during the heating or cooking of a food item that is associated with the tray or other construct. For example, the blank, tray, container, or other construct may be formed at least partially from one or more microwave energy interactive elements (hereinafter sometimes referred to as "microwave interactive elements") that promote heating, browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular construct and food item.

In the case of a susceptor or shield, the microwave energy interactive material may comprise an electroconductive or semiconductive material, for example, a vacuum deposited metal or metal alloy, or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the microwave energy interactive material may be carbon-based, for example, as disclosed in U.S. Pat. Nos. 4,943,456, 5,002,826, 5,118,747, and 5,410,135.

In still other embodiments, the microwave energy interactive material may interact with the magnetic portion of the electromagnetic energy in the microwave oven. Correctly chosen materials of this type can self-limit based on the loss of interaction when the Curie temperature of the material is reached. An example of such an interactive coating is described in U.S. Pat. No. 4,283,427.

The use of other microwave energy interactive elements is also contemplated. In one example, the microwave energy interactive element may comprise a foil or high optical density evaporated material having a thickness sufficient to reflect a substantial portion of impinging microwave energy. Such elements typically are formed from a conductive, reflective metal or metal alloy, for example, aluminum, copper, or stainless steel, in the form of a solid "patch" generally having a thickness of from about 0.000285 inches to about 0.005 inches, for example, from about 0.0003 inches to about 0.003 inches. Other such elements may have a thickness of from about 0.00035 inches to about 0.002 inches, for example, 0.0016 inches.

In some cases, microwave energy reflecting (or reflective) elements may be used as shielding elements where the food item is prone to scorching or drying out during heating. In other cases, smaller microwave energy reflecting elements may be used to diffuse or lessen the intensity of microwave energy. One example of a material utilizing such microwave energy reflecting elements is commercially available from Graphic Packaging International, Inc. (Marietta, Ga.) under the trade name MicroRite® packaging material. In other examples, a plurality of microwave energy reflecting elements may be arranged to form a microwave energy distributing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy. The breaks or apertures may extend through the entire structure, or only through one or more layers. The number, shape, size, and positioning of such breaks or apertures may vary for a particular application depending on the type of construct being formed, the food item to be heated therein or thereon, the desired degree of heating, browning, and/or crisping, whether direct exposure to microwave energy is needed or desired to attain uniform heating of the food item, the need for regulating the change in temperature of the food item through direct heating, and whether and to what extent there is a need for venting.

By way of illustration, a microwave energy interactive element may include one or more transparent areas to effect dielectric heating of the food item. However, where the microwave energy interactive element comprises a susceptor, such apertures decrease the total microwave energy interactive area, and therefore, decrease the amount of microwave energy interactive material available for heating, browning, and/or crisping the surface of the food item. Thus, the relative amounts of microwave energy interactive areas and microwave energy transparent areas may be balanced to attain the desired overall heating characteristics for the particular food item.

As another example, one or more portions of a susceptor may be designed to be microwave energy inactive to ensure that the microwave energy is focused efficiently on the areas to be heated, browned, and/or crisped, rather than being lost to portions of the food item not intended to be browned and/or crisped or to the heating environment. Additionally or alternatively, it may be beneficial to create one or more discontinuities or inactive regions to prevent overheating or charring of the food item and/or the construct including the susceptor.

As still another example, a susceptor may incorporate one or more "fuse" elements that limit the propagation of cracks in the susceptor, and thereby control overheating, in areas of the susceptor where heat transfer to the food is low and the susceptor might tend to become too hot. The size and shape of the fuses may be varied as needed. Examples of susceptors including such fuses are provided, for example, in U.S. Pat. No. 5,412,187, U.S. Pat. No. 5,530,231, U.S. Patent Application Publication No. US 2008/0035634A1, published Feb. 14, 2008, and PCT Application Publication No. WO 2007/127371, published Nov. 8, 2007, each of which is incorporated by reference herein in its entirety.

The blanks according to the present invention can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blanks. The blanks may also be coated with, for example, a moisture barrier layer, on either or both sides of the blanks.

In accordance with the exemplary embodiments, the blanks and/or other constructs may be constructed of paperboard of a caliper such that it is heavier and more rigid than ordinary paper. The blanks can also be constructed of other materials, such as cardboard, hard paper, or any other material having properties suitable for enabling the carton package to function at least generally as described above.

The foregoing description illustrates and describes various embodiments of the present disclosure. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, and alterations, etc., of the above-described embodiments. Additionally, the disclosure shows and describes only selected embodiments, but various other combinations, modifications, and environments are contemplated and are within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

What is claimed is:

1. A container for heating a food product with microwave energy comprising a wavelength, the container comprising:
a generally circular centerline having an axis, wherein the centerline has a first diameter that is generally equal to the wavelength of the microwave energy;
a receptacle comprising a sidewall extending at least partially around a cavity, at least a portion of the cavity extending along at least a portion of the centerline;
the sidewall comprising an inner edge and an outer edge each being spaced apart from the axis of the centerline for at least partially retaining the food product in the cavity in proximity to the centerline, wherein the inner edge is generally circular and is generally concentric with the centerline, and the inner edge has a second diameter that is generally equal to at least half the wavelength of the microwave energy.

2. The container of claim 1, wherein the outer edge extends around an outer perimeter of the receptacle and is spaced apart from the inner edge by at least half the wavelength of the microwave energy.

3. The container of claim 1, wherein the inner edge extends along an inner perimeter of the receptacle and at least partially around the axis of the centerline.

4. The container of claim 3, wherein the outer edge extends along an outer perimeter of the receptacle and at least partially around the axis of the centerline.

5. The container of claim 3, further comprising an inner receptacle disposed within the inner perimeter.

6. The container of claim 5, wherein the inner receptacle is generally confined to within a quarter of the wavelength from the axis of the centerline.

7. The container of claim 6, wherein the food product comprises a primary food item for being disposed in the cavity of the receptacle and a secondary food item for being disposed in a secondary container that is for being received in the inner receptacle, and the primary food item is for being exposed to relatively higher microwave energy in the cavity of the receptacle than the secondary food item in the inner receptacle.

8. The container of claim 7, wherein the primary food item comprises a generally lossless dielectric material and the secondary food item comprises a dielectric material that is relatively lossy with respect to the generally lossless dielectric material.

9. The container of claim 5, further comprising an inner flange extending inwardly from the inner edge, the inner flange at least partially defining the inner receptacle.

10. The container of claim 3, further comprising an inner spacing feature at least partially defined by the inner edge.

11. The container of claim 1, further comprising an inner flange extending from the inner edge and an outer flange extending from the outer edge.

12. The container of claim 11, wherein the inner flange extends along an inner perimeter of the receptacle and the outer flange extends along an outer perimeter of the receptacle.

13. The container of claim 1, wherein:
the receptacle is a first receptacle, the sidewall is a first sidewall, and the cavity is a first cavity;
the container further comprises at least a second receptacle comprising a second sidewall extending at least partially around a second cavity, at least a portion of the second cavity extending along at least a portion of the centerline.

14. The container of claim 13, wherein each of the first sidewall and the second side wall comprises an inner portion, an outer portion spaced apart from the inner portion, and an oblique portion extending from the respective inner portion to the respective outer portion.

15. The container of claim 14, wherein the oblique portion of the first sidewall is disposed proximate to the oblique portion of the second sidewall.

16. The container of claim 14, wherein, for each of the first sidewall and the second sidewall, the inner portion is spaced apart from the axis of the centerline by at least a quarter of the wavelength from the axis of the centerline.

17. The container of claim 16, wherein, for each of the first sidewall and the second sidewall, the outer portion is spaced apart from the inner portion by generally less than half the wavelength of the microwave energy.

18. The container of claim 13, further comprising a support element comprising a top panel with at least a first opening at least partially receiving the first receptacle and a second opening at least partially receiving the second receptacle.

19. The container of claim 18, wherein the first opening and the second opening of the support element at least partially retain the respective first receptacle and second receptacle so that each of the first cavity and the second cavity is at least partially disposed along at least a portion of the centerline.

20. The container of claim 18, wherein the first receptacle comprises a first flange extending from the first sidewall and the second receptacle comprises a second flange extending from the second sidewall, and each of the first flange and the second flange engages the top panel of the support element to at least partially support the respective first receptacle and second receptacle.

21. The container of claim 1, wherein the wavelength of the microwave energy is an average wavelength of the microwave energy.

22. The container of claim 1, wherein the wavelength of the microwave energy is an average wavelength of the microwave energy, and the cavity comprises a maximum width extending radially from the inner edge to the outer edge, the maximum width being generally equal to or less than half the average wavelength of the microwave energy.

23. The container of claim 22, wherein the food product comprises a generally lossless dielectric material.

24. A method of heating a food product, comprising:
obtaining a container comprising a generally circular centerline having an axis and a first diameter, a receptacle comprising a sidewall extending at least partially around a cavity, at least a portion of the cavity extending along at least a portion of the centerline, the sidewall comprising an inner edge and an outer edge each being spaced apart from the axis of the centerline for at least partially retaining the food product in the cavity in proximity to the centerline, wherein the inner edge is generally circular, is generally concentric with the centerline, and has a second diameter;
positioning at least a portion of the food product in the cavity; and
exposing the container and the food product to microwave energy comprising a wavelength, wherein the first diameter is generally equal to the wavelength of the microwave energy, and has the second diameter is generally equal to at least half the wavelength of the microwave energy.

25. The method of claim 24, wherein the outer edge extends around an outer perimeter of the receptacle and is spaced apart from the inner edge by at least half the wavelength of the microwave energy.

26. The method of claim 24, wherein:
the container further comprises an inner receptacle disposed within the inner perimeter, wherein:
the food product comprises a primary food item and a secondary food item, the positioning at least a portion of the food product comprises positioning the first food item in the cavity; and
the method further comprises disposing the secondary food item in a secondary container and positioning the secondary container to be at least partially received in the inner receptacle.

27. The method of claim 26, wherein the inner receptacle is generally confined to within a quarter of the wavelength from the axis of the centerline, and the exposing the container and the food product to the microwave energy comprises producing the microwave energy having at least the wavelength so that the primary food item generally is exposed to a relatively higher intensity of the microwave energy in the cavity of the receptacle than the secondary food item is generally exposed to in the inner receptacle.

28. The method of claim 27, wherein the primary food item comprises a generally lossless dielectric material and the secondary food item comprises a dielectric material that is relatively lossy with respect to the generally lossless dielectric material.

29. The method of claim 24, wherein:
the receptacle is a first receptacle, the sidewall is a first sidewall, and the cavity is a first cavity;
the container further comprises at least a second receptacle comprising a second sidewall extending at least partially around a second cavity, at least a portion of the second cavity extending along at least a portion of the centerline; and
the positioning at least a portion of the food product further comprises positioning at least a portion of the food product in the second cavity.

30. The method of claim 29, wherein the container further comprises a support element comprising a top panel with at least a first opening at least partially receiving the first receptacle and a second opening at least partially receiving the second receptacle, the method further comprising at least partially removing at least one of the first receptacle and the second receptacle from the support element after the exposing the container and the food product to the microwave energy.

31. The method of claim 24, wherein the wavelength of the microwave energy is an average wavelength of the microwave energy.

32. The method of claim 31, wherein the food product comprises a generally lossless dielectric material.

33. A package comprising a container holding a food product for heating the food product with microwave energy comprising a wavelength, the container comprising:

a generally circular centerline having an axis, wherein the centerline has a first diameter that is generally equal to the wavelength of the microwave energy;

a receptacle comprising a sidewall extending at least partially around a cavity, at least a portion of the cavity extending along at least a portion of the centerline;

the sidewall comprising an inner edge and an outer edge each being spaced apart from the axis of the centerline for at least partially retaining the food product in the cavity in proximity to the centerline, wherein the inner edge is generally circular and is generally concentric with the centerline, the inner edge has a second diameter that is generally equal to at least half the wavelength of the microwave energy, and the inner edge extends along an inner perimeter of the receptacle and at least partially around the axis of the centerline;

an inner receptacle disposed within the inner perimeter;

the food product comprising a primary food item disposed in the cavity of the receptacle and a secondary food item disposed in a secondary container received in the inner receptacle, the primary food item comprising a generally lossless dielectric material and the secondary food item comprising a dielectric material that is relatively lossy with respect to the generally lossless dielectric material, wherein the primary food item is for being exposed to relatively higher microwave energy in the cavity of the receptacle than the secondary food item in the inner receptacle.

* * * * *